United States Patent
Ljolje et al.

(10) Patent No.: US 9,576,582 B2
(45) Date of Patent: *Feb. 21, 2017

(54) SYSTEM AND METHOD FOR ADAPTING AUTOMATIC SPEECH RECOGNITION PRONUNCIATION BY ACOUSTIC MODEL RESTRUCTURING

(71) Applicant: AT&T INTELLECTUAL PROPERTY I, LP, Atlanta, GA (US)

(72) Inventors: Andrej Ljolje, Morris Plains, NJ (US); Alistair D. Conkie, Morristown, NJ (US); Ann K. Syrdal, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/051,317

(22) Filed: Feb. 23, 2016

(65) Prior Publication Data

US 2016/0171984 A1    Jun. 16, 2016

Related U.S. Application Data

(63) Continuation of application No. 14/698,183, filed on Apr. 28, 2015, now Pat. No. 9,305,547, which is a
(Continued)

(51) Int. Cl.
*G10L 15/04* (2013.01)
*G10L 17/14* (2013.01)
(Continued)

(52) U.S. Cl.
CPC .......... *G10L 17/14* (2013.01); *G10L 15/063* (2013.01); *G10L 15/07* (2013.01); *G10L 15/14* (2013.01);
(Continued)

(58) Field of Classification Search
CPC .... G10L 13/00; G10L 2013/00; G10L 15/065; G10L 2015/0631; G09B 1/00; G06F 2003/00; G06F 17/30746
(Continued)

(56) References Cited

U.S. PATENT DOCUMENTS 5,293,451 A * 3/1994 Brown et al. ............... 704/245
5,390,278 A * 2/1995 Gupta et al. ............... 704/243
(Continued)

*Primary Examiner* — Michael Colucci

(57) ABSTRACT

Disclosed herein are systems, computer-implemented methods, and computer-readable storage media for recognizing speech by adapting automatic speech recognition pronunciation by acoustic model restructuring. The method identifies an acoustic model and a matching pronouncing dictionary trained on typical native speech in a target dialect. The method collects speech from a new speaker resulting in collected speech and transcribes the collected speech to generate a lattice of plausible phonemes. Then the method creates a custom speech model for representing each phoneme used in the pronouncing dictionary by a weighted sum of acoustic models for all the plausible phonemes, wherein the pronouncing dictionary does not change, but the model of the acoustic space for each phoneme in the dictionary becomes a weighted sum of the acoustic models of phonemes of the typical native speech. Finally the method includes recognizing via a processor additional speech from the target speaker using the custom speech model.

20 Claims, 4 Drawing Sheets

Related U.S. Application Data continuation of application No. 14/459,696, filed on Aug. 14, 2014, now Pat. No. 9,026,442, which is a continuation of application No. 14/043,175, filed on Oct. 1, 2013, now Pat. No. 8,812,315, which is a continuation of application No. 12/480,848, filed on Jun. 9, 2009, now Pat. No. 8,548,807.

(51) Int. Cl.
| | | |
|---|---|---|
| *G10L 15/07* | (2013.01) | |
| *G10L 15/187* | (2013.01) | |
| *G10L 15/06* | (2013.01) | |
| *G10L 15/14* | (2006.01) | |
| *G10L 15/26* | (2006.01) | |
| *G10L 15/30* | (2013.01) | |
| G10L 15/02 | (2006.01) | |

(52) U.S. Cl.
CPC ........... *G10L 15/187* (2013.01); *G10L 15/265* (2013.01); *G10L 15/30* (2013.01); *G10L 2015/025* (2013.01)

(58) Field of Classification Search
USPC ... 704/9, 257, 256, 255, 254, 251, 249, 246, 704/245, 243, 242, 236, 235, 10, 244; 345/473
See application file for complete search history.

(56) References Cited

U.S. PATENT DOCUMENTS

| | | | | |
|---|---|---|---|---|
| 5,613,056 | A * | 3/1997 | Gasper et al. | 345/473 |
| 5,621,859 | A * | 4/1997 | Schwartz et al. | 704/256 |
| 5,794,197 | A * | 8/1998 | Alleva et al. | 704/255 |
| 5,822,728 | A * | 10/1998 | Applebaum et al. | 704/254 |
| 6,108,628 | A * | 8/2000 | Komori et al. | 704/256 |
| 6,163,768 | A * | 12/2000 | Sherwood et al. | 704/235 |
| 6,882,970 | B1 * | 4/2005 | Garner et al. | 704/236 |
| 6,973,427 | B2 * | 12/2005 | Hwang et al. | 704/249 |
| 7,092,883 | B1 * | 8/2006 | Gretter et al. | 704/242 |
| 2002/0128820 | A1 * | 9/2002 | Goronzy et al. | 704/10 |
| 2004/0210438 | A1 * | 10/2004 | Gillick et al. | 704/254 |
| 2005/0165602 | A1 * | 7/2005 | Cote et al. | 704/9 |
| 2005/0187758 | A1 * | 8/2005 | Khasin | 704/10 |
| 2006/0155538 | A1 * | 7/2006 | Higgins et al. | 704/246 |
| 2007/0055524 | A1 * | 3/2007 | Cao et al. | 704/257 |
| 2008/0294440 | A1 * | 11/2008 | Higgins et al. | 704/251 |
| 2009/0313019 | A1 * | 12/2009 | Kato et al. | 704/254 |
| 2010/0305948 | A1 * | 12/2010 | Simone et al. | 704/255 |

\* cited by examiner

SYSTEM AND METHOD FOR ADAPTING AUTOMATIC SPEECH RECOGNITION PRONUNCIATION BY ACOUSTIC MODEL RESTRUCTURING

CROSS-REFERENCE TO RELATED APPLICATIONS

This application is a Continuation of and claims priority to U.S. patent application Ser. No. 14/698,183 filed Apr. 28, 2015, which is a continuation of U.S. patent application Ser. No. 14/459,696, filed Aug. 14, 2014, which is a continuation of U.S. patent application Ser. No. 14/043,175, filed Oct. 1, 2013, now U.S. Pat. No. 8,812,315, issued Aug. 19, 2014, which is a continuation of U.S. patent application Ser. No. 12/480,848, filed Jun. 9, 2009, now U.S. Pat. No. 8,548,807, issued Oct. 1, 2013. The contents of each of the foregoing is/are hereby incorporated by reference into this application as if set forth herein in full.

TECHNICAL FIELD

The present application relates to speech recognition and more specifically to adapting acoustic models for specific speakers or classes of speakers.

BACKGROUND

Speech recognition applications typically rely on a single acoustic model that represents all potential speakers. Often, a generic speech model is used to recognize speech from multiple users. However, a single canonical model that represents all speakers generically is not well suited to many individuals in minority accent groups of a given population. For instance, strong regional accents or speakers with a foreign accent often encounter speech recognition difficulties stemming from numerous differences between their way of speaking and the single canonical model. These difficulties can slow down user speech interaction, thereby frustrating users, or prevent speech interaction altogether.

In many cases, the number of speakers making up a regional accent or foreign accent group is very small. Due to the small number of speakers, data is too sparse to build specific acoustic models for each class of dialect or accent. One known solution is to modify pronunciation dictionaries by providing alternative phoneme sequences for word pronunciations which differ depending on the dialect or accent. For example, speakers from the southern states pronounce many vowels as diphthongs, or some accents have low separation between some sounds like "l" and "r". One current approach in the art is to account for these differences to some extent by expanding the allowed pronunciations to include all the possible variations. This approach has the drawback of introducing additional confusion into the speech recognition model, which can reduce the overall speech recognition accuracy.

SUMMARY

Additional features and advantages of the disclosure will be set forth in the description which follows, and in part will be obvious from the description, or may be learned by practice of the herein disclosed principles. The features and advantages of the disclosure may be realized and obtained by means of the instruments and combinations particularly pointed out in the appended claims. These and other features of the disclosure will become more fully apparent from the following description and appended claims, or may be learned by the practice of the principles set forth herein.

Disclosed are systems, computer-implemented methods, and tangible computer-readable storage media for recognizing speech by adapting automatic speech recognition pronunciation by acoustic model restructuring. The method first identifies an acoustic model and a matching pronouncing dictionary trained on typical native speech. Next the method collects speech from a new speaker resulting in collected speech. The method transcribes the collected speech to generate a lattice of plausible phonemes which depend on the properties of the target dialect. Reference transcriptions or recognition output can be used in this step. Finally, the method creates a custom speech model for representing each phoneme used in the pronouncing dictionary by a weighted sum of acoustic models for all the plausible phonemes, wherein the pronouncing dictionary does not change, but the model of the acoustic space for each phoneme in the dictionary becomes a weighted sum of the acoustic models of the original generic speakers phonemes of the typical native speech. Finally the method recognizes via a processor additional speech from the new speaker using the custom speech model. The target speaker can represent a class of speakers. The method can further iteratively replace selected phonemes with updated weighted sums of phonemes based on the recognized additional speech and incorporate updated phonemes into an updated speech model.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
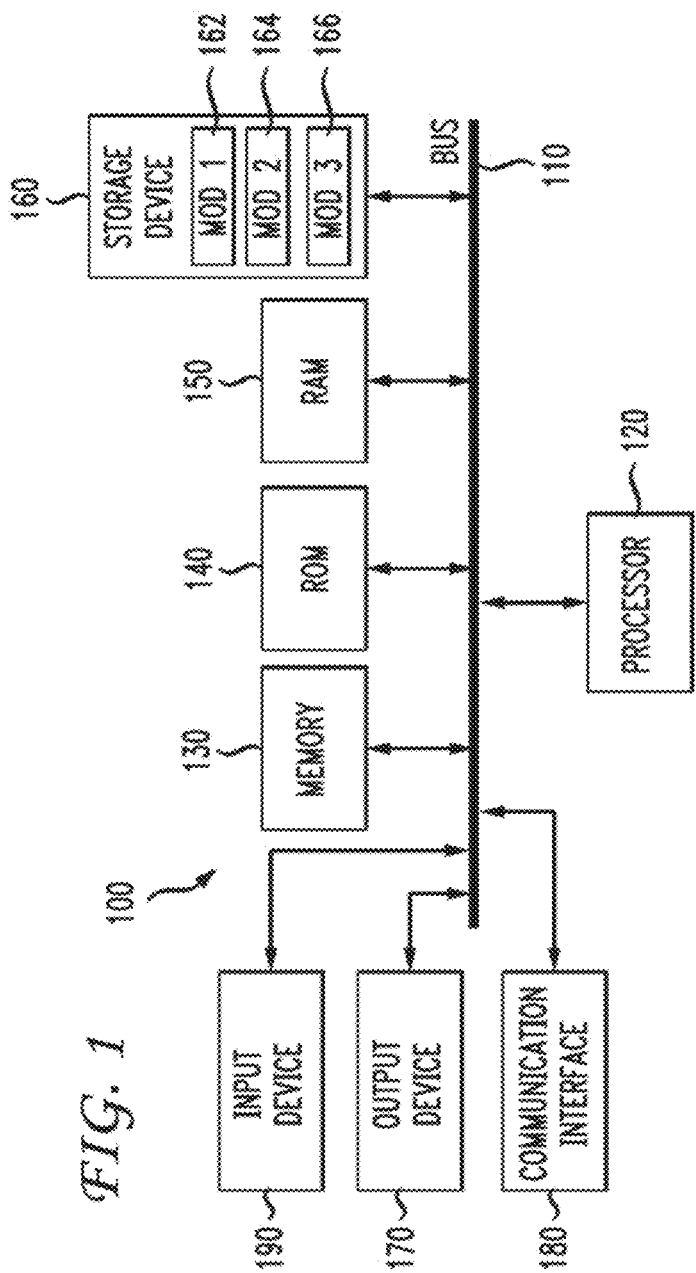
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as comprising individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations. It is understood that server 402 in FIG. 4 as well as other components shown in FIG. 4 can include a processor and other components as those shown in FIG. 1.

Figure 2:
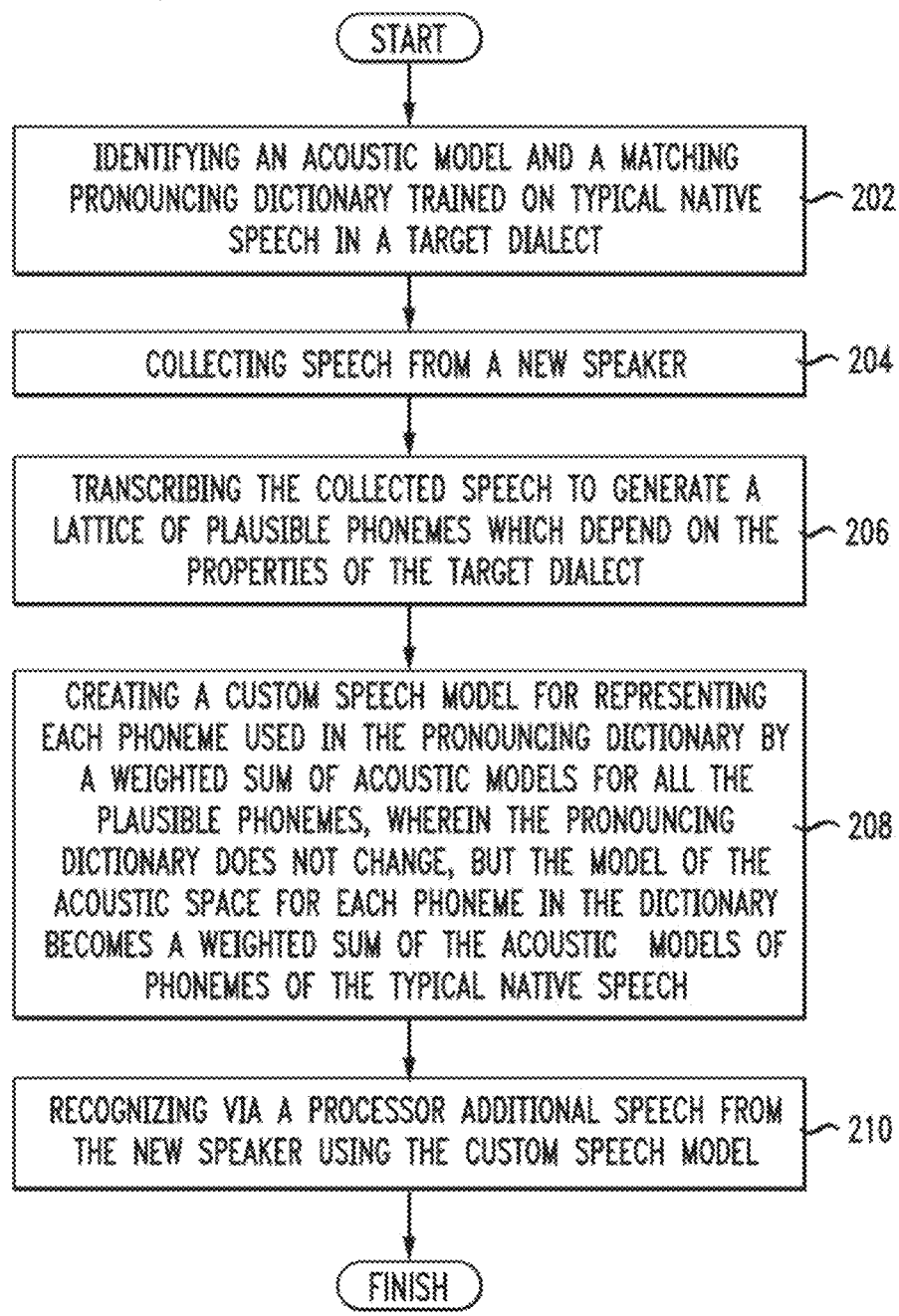
FIG. 2 illustrates an example method embodiment.

Having disclosed some basic system components, the disclosure now turns to the exemplary method embodiment shown in FIG. 2. For the sake of clarity, the method is discussed in terms of an exemplary system as shown in FIG. 1 or the system 400 with server 402 in FIG. 4 configured to practice the method.

As a preliminary matter, a distinction exists between a symbol and the acoustic realization of it. A dictionary has symbols and an acoustic realization is what people actually say. What people say is often different from what the symbol represents, especially in various regional accents with divergent pronunciations. Pronunciation adaptation schemes use symbols for acoustic realization. This approach can be very confusing because symbols are the same, but they mean different things. One pronunciation per word, they are phonemes or linguistic symbols. An acoustic version is a phone, or acoustic realization, so a vowel can be realized as a vowel, diphthongized vowel, reduced vowel, stressed vowel, etc. These realizations can be represented by phone symbols.

FIG. 2 illustrates an exemplary method of recognizing speech by adapting automatic speech recognition pronunciation by acoustic model restructuring. An exemplary system 100, such as the one shown in FIG. 1 or the system 400 can practice this method. The system 100, 400 first identifies an acoustic model and a matching pronouncing dictionary trained on typical native speech in a target dialect (202) and collects speech from a new speaker (204). The target speaker can represent a class of speakers. In many cases, the target speaker speaks with at least one of a regional dialect and a foreign accent or some other unusual or unexpected speech pattern. The target speaker can be selected based on proximity to the most common accent of the class of speakers. In some embodiments, the target speaker is not one individual but is instead a collection of individuals with a similar dialect. For example, the target speaker can be a group of speakers with varying degrees of a specific accent. This approach allows the acoustic model to effectively cover a wide pronunciation spectrum of the accent. The number of speakers is not important so long as the system processor 120 and memory 130 have access to sufficient training data. The system 100, 400 simply provides an additional array showing how to mix and match the speech from different speakers to generate the new model.

The system 100, 400 can process speech dynamically. In one example, the system 100, 400 interacts with ten classes of speakers. The system 100, 400 groups speakers into categories in memory, focusing on outliers rather than mainstream speakers to focus on the edges of the current coverage of the acoustic space. For the ten classes, the system 100, 400 can create a new acoustic model in memory by modifying with the existing acoustic model. For each of the roughly 40 phonemes and 10,000 units, the system 100, 400 creates new versions in memory 130 for each specific category by collecting all the data and taking the nearest model in the acoustic space to find a weighted sum of the acoustic models that best model the acoustic space of that class of speakers. Gaussians (means and variances and weights) do not change. The system generates a new phoneme based on a weighted sum of the collection of phonemes. One real-life example is weighting "L" and "R" equally for Oriental speakers who tend to confuse those two sounds in speech. That way, the model still covers both pronunciations whether correct or incorrect and can appropriately recognize the speech.

Figure 3:
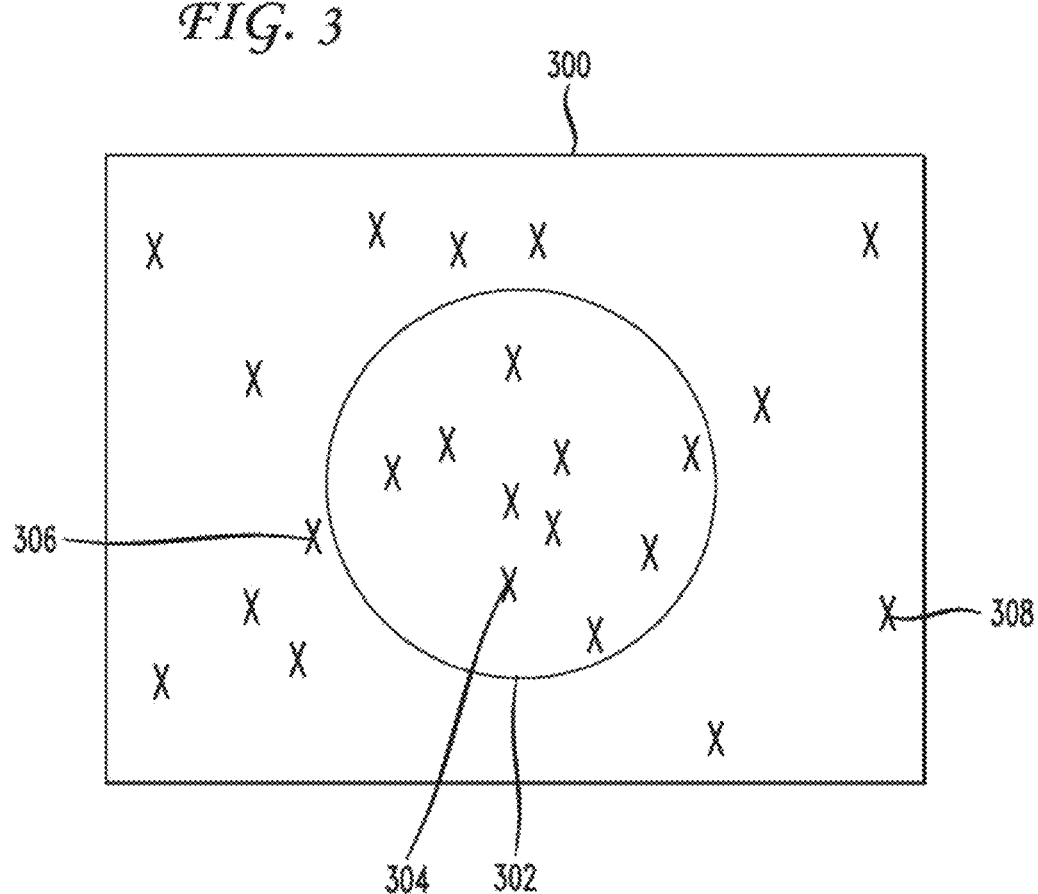
FIG. 3 illustrates an example 2-dimensional representation of an acoustic space.

FIG. 3 is an example illustration of outliers shown on a two-dimensional representation 300 of an acoustic space 302. The acoustic space is designed to include speakers having what is considered to be a mainstream accent 304. Some speakers are close to the mainstream 306 while others are very remote from the mainstream 308. A system 100 as set forth in FIG. 1 or system 400 in FIG. 4 can generate speech models based on the speaker input. Such a system 100, 400 derives more benefit from including remote outliers than it does from including those who are close to the mainstream.

The system 100, 400 then transcribes the collected speech to generate a lattice of plausible phonemes which depend on the properties of the target dialect (206) and creates a custom speech model for representing each phoneme used in the pronouncing dictionary by a weighted sum of acoustic models for all the plausible phonemes, wherein the pronouncing dictionary does not change, but the model of the acoustic space for each phoneme in the dictionary becomes a weighted sum of the acoustic models of phonemes of the typical native speech (208). In one aspect, the custom speech model is a Gaussian mixture model. A mixture model is a model where independent variables are fractions of the total. An acoustic model with a mixture of Gaussians can deal with speaker variability. If speakers from the South diphthongize and speakers from Boston elongate, the system puts all this information in the same symbol and lets the Gaussian mixture model sort it out and create a reasonable representation based on the inputs. The system can be trained to determine and assign weights for each of these elements in a mixture model. For example, the system can modify an /ow/ (in DARPA phoneme set, or DARPAbet, notation) to include a little of the original /ow/ as well as /aa/, /eh/, /uw/, etc. The system can be trained to determine appropriate weights for these portions, the group replacing the original /ow/ and becoming the new /ow/.

The system 100, 400 can modify the existing acoustic speech model by optimizing an objective function. Objective functions can include, among others, likelihood, mutual information, accuracy, complexity, etc. The objective function can be optimized through the appropriate training algorithm. Those of skill in the art will recognize the many permutations of objective functions and their appropriate application to the principles described herein.

In this way, the system 100, 400 bases the custom speech model on human transcriptions of speech. The custom speech model is not a new dictionary. The system 100, 400 creates a new acoustic model by altering the existing acoustic model. The custom speech model includes parts of the original or old acoustic model. The modified acoustic model can account for wide linguistic variability, even within a specific dialect group.

The system 100, 400 then recognizes additional speech from the target speaker using the custom speech model (206). The processor 120 can perform the recognizing and/or any other step. In one embodiment, the system iteratively replaces the selected phoneme with an updated weighted sum of phonemes based on the recognized additional speech. The system 100 can further create an updated speech model incorporating the updated weighted sum of phonemes. In this manner, the system 100, 400 can continually or periodically refine the speech model as it detects areas for improvement.

Figure 4:
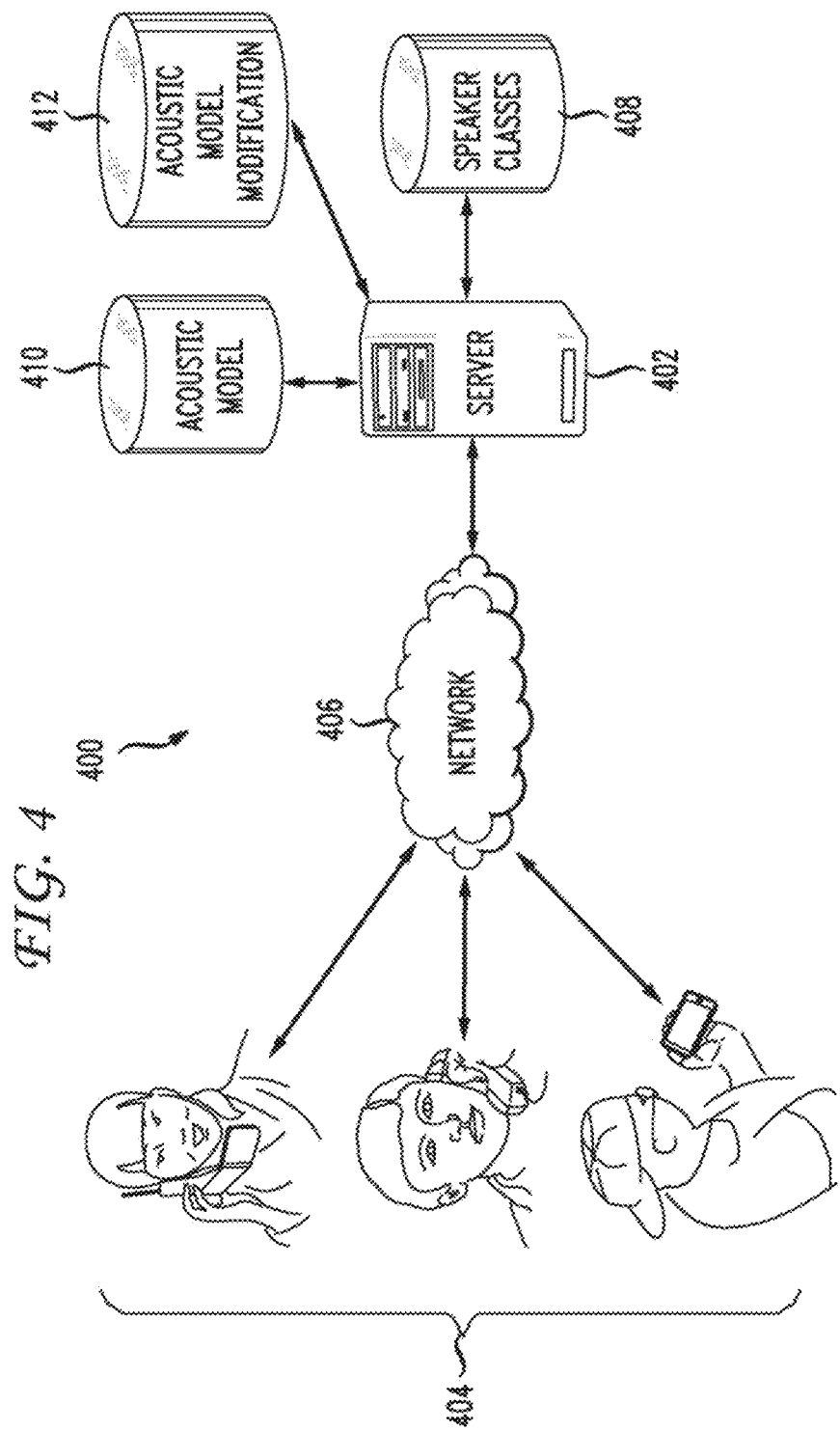
FIG. 4 illustrates an exemplary system for adapting automatic speech recognition pronunciation by acoustic model restructuring.

FIG. 4 illustrates an exemplary system 400 for adapting automatic speech recognition pronunciation by acoustic model restructuring. The server 402 identifies an acoustic space of each phoneme in an acoustic model based on initial recognized speech from a target speaker, the acoustic space representing different pronunciations of a same sound in each respective phoneme. The server 402 can be configured substantially as shown in FIG. 1. The server 402 can receive speech from one or more target speakers 404 through a speech and/or data network 406. The server 402 classifies the speakers into speaker classes 408 based on language, accent and/or dialect. The server 402 then proceeds to creating a custom speech model 410 by replacing a selected phoneme in the acoustic model with a weighted sum of phonemes that better represents the acoustic space of the selected phoneme for speakers of a class. After the initial training of the acoustic model, the server 402 recognizes additional speech using the custom speech model from the same or other speakers 404. As the system encounters additional speech samples, the server 402 modifies the existing acoustic speech models by replacing the selected phoneme with an updated weighted sum of phonemes based on the recognized additional speech and optionally creating an updated speech model incorporating the updated weighted sum of phonemes.

Traditional speech recognition approaches rely on a single acoustic model that represents all the potential speakers. However, for many users the single acoustic model is not a good representation, such as speakers with strong regional accents or with a foreign accent. The system uses a new pronunciation model by replacing the representation of each phoneme in the acoustic model with a modified representation that better represents the acoustic space of each phoneme for the target speaker or class of speakers. This approach stands in contrast to the previous approach of modifying the pronunciation alternatives and their probabilities in the pronunciation lexicon. The system changes the representation by replacing the acoustic model of a given phoneme by a weighted sum of the models for all phonemes. In practice this will reduce to a weighted sum of just a few phonemes which are similar to the original phoneme. In this way a vowel that is heavily accented and falls in between the usual realizations of two conventional realizations of acoustically neighboring vowels is represented as the weighted sum of the phoneme models for the two vowels. Neither of the two vowels in isolation is a good representation of the accented vowel, but together they form an improved approximation for the model of the accented vowel, allowing for flexible recognition of both.

The system does not introduce additional pronunciations into the acoustic model. Rather, the system changes the acoustic definition of the phonemes which represent words in the dictionary. For example, a mixture of three components can represent a diphthongized vowel: the original vowel, the vowel it transformed into, and the diphthong formed by the two vowels. In order to achieve this expanded acoustic representation, the system modifies the existing acoustic model so that a relatively small amount of data is necessary to create a dialect/accent specific model. The system automatically modifies the acoustic model by optimizing an objective function such as likelihood, accuracy, or others. The system further modifies the contribution of all the phonemes to create a new representation of the dialect/accent specific version of the original phoneme used in the dictionary. This approach finely tailors the acoustic space for a "modified" phoneme to its acoustic properties rather than simply replacing one canonical phoneme with another. This approach is successful because the true realization might be acoustically somewhere in-between the original phoneme and the dialect/accent specific phoneme.

The disclosed principles provide a benefit of significantly improved accuracy for a relatively small subset of the speaker population which finds it hard to use any speech recognition application. For example, speakers with strong regional accents and dialects encounter great difficulty when interacting with a spoken dialog system based on a generic speech model. Improvements for this group of speakers are so large that they can use speech applications with virtually the same performance as mainstream speakers whereas the same speech applications are impossible to use without these improvements.

Embodiments within the scope of the present disclosure may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein are directed primary to automatic speech recognition, but are also equally applicable to voice over IP (VoIP), natural language dialog systems, and speech commands. Those skilled in the art will readily recognize various modifications and changes that may be made to the principles described herein without following the example embodiments and applications illustrated and described herein, and without departing from the spirit and scope of the disclosure.

We claim:

1. A method comprising:
    obtaining, by a system comprising a processor, information associated with an acoustic model, wherein the acoustic model is trained on native speech in a target dialect; and
    updating, by the system, the information associated with the acoustic model to replace a first phoneme in the acoustic model with a second phoneme, wherein the second phoneme comprises a sum of values associated with plausible phonemes in a lattice of plausible phonemes associated with a type of speaker.

2. The method of claim 1, wherein upon replacing the first phoneme in the acoustic model, the acoustic model becomes a Gaussian mixture model.

3. The method of claim 1, wherein the native speech represents the type of speaker.

4. The method of claim 1, wherein the target dialect comprises a regional dialect, a foreign accent, or a combination thereof.

5. The method of claim 1, wherein the updating the information associated with the acoustic model is based on evaluating an objective function.

6. The method of claim 5, wherein the objective function comprises an accuracy associated with the first phoneme, a complexity of the phoneme, or a combination thereof.

7. The method of claim 1, wherein the updating further comprises replacing at least a portion of phonemes in the acoustic model with other phonemes comprising other sums of values associated with plausible phonemes in other lattices of plausible phonemes.

8. A system comprising:
a processor; and
a memory that stores executable instructions that, when executed by the processor, facilitate performance of operations, comprising:
identifying an acoustic model configured in a native speech in a target dialect; and
replacing a first phoneme in the acoustic model with a second phoneme, wherein the second phoneme is a sum of plausible phonemes in a lattice of plausible phonemes associated with a class of a speaker.

9. The system of claim 8, wherein the plausible phonemes are weighted.

10. The system of claim 8, wherein the native speech is associated with the class of the speaker.

11. The system of claim 8, wherein the target dialect comprises a regional dialect, a foreign accent, or a combination thereof.

12. The system of claim 8, wherein the replacing of the first phoneme in the acoustic model is performed according to an objective function.

13. The system of claim 12, wherein the objective function comprises an accuracy associated with the phoneme, information identifying a complexity of the phoneme, or a combination thereof.

14. The system of claim 8, wherein the replacing comprises replacing at least a portion of phonemes in the acoustic model with other phonemes determined according to other sums of plausible phonemes in other lattices of plausible phonemes.

15. A non-transitory machine-readable storage device, comprising executable instructions that, when executed by a processor, cause the processor to perform operations, comprising:
identifying a phoneme model, wherein the phoneme model is configured according to a target dialect; and
replacing a first phoneme in the phoneme model with a second phoneme, wherein the second phoneme obtained according to a sum of plausible phonemes in a lattice of plausible phonemes associated with a class of a speaker.

16. The non-transitory machine-readable storage device of claim 15, wherein upon replacing the first phoneme in the phoneme model, the phoneme model becomes a Gaussian mixture model.

17. The non-transitory machine-readable storage device of claim 15, wherein the phoneme model is further configured according to a native speech associated with the class of the speaker.

18. The non-transitory machine-readable storage device of claim 15, wherein the target dialect comprises a regional dialect, a foreign accent, or a combination thereof.

19. The non-transitory machine-readable storage device of claim 15, wherein the replacing of the first phoneme in the phoneme model is based on an objective function.

20. The non-transitory machine-readable storage device of claim 19, wherein the objective function comprises an estimated accuracy associated with the first phoneme and information identifying a complexity of the phoneme.

* * * * *